(12) United States Patent
Bechtold et al.

(10) Patent No.: US 12,089,602 B2
(45) Date of Patent: Sep. 17, 2024

(54) ROTARY MOLDED FOOD PRODUCT AND METHODS OF MAKING

(71) Applicant: General Mills, Inc., Minneapolis, MN (US)

(72) Inventors: Roy A Bechtold, St. Louis Park, MN (US); Adam Cory Nelson, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 577 days.

(21) Appl. No.: 16/613,685

(22) PCT Filed: Jul. 17, 2017

(86) PCT No.: PCT/US2017/042343
§ 371 (c)(1),
(2) Date: Nov. 14, 2019

(87) PCT Pub. No.: WO2019/017870
PCT Pub. Date: Jan. 24, 2019

(65) Prior Publication Data
US 2020/0163347 A1    May 28, 2020

(51) Int. Cl.
| A21D 8/02 | (2006.01) |
| A21C 11/00 | (2006.01) |
| A21D 13/068 | (2017.01) |
| A21D 13/22 | (2017.01) |
| A21D 13/32 | (2017.01) |

(52) U.S. Cl.
CPC .......... *A21D 13/068* (2013.01); *A21C 11/008* (2013.01); *A21D 8/02* (2013.01); *A21D 13/22* (2017.01); *A21D 13/32* (2017.01); *A23V 2002/00* (2013.01)

(58) Field of Classification Search
None
See application file for complete search history.

(56) References Cited

U.S. PATENT DOCUMENTS

| 3,276,397 A | 10/1966 | Poppe et al. | |
| 4,717,577 A * | 1/1988 | Constance | A21D 2/183 |
| | | | 426/549 |
| 5,297,947 A | 3/1994 | Cardinali | |

(Continued)

FOREIGN PATENT DOCUMENTS

| EP | 2997827 | 3/2016 |
| EP | 3040001 | 7/2016 |

(Continued)

OTHER PUBLICATIONS

Mintel, "*Cookies 'N' Crème*", http://www.gnpd.com, Jul. 2008.

(Continued)

*Primary Examiner* — Lien T Tran
(74) *Attorney, Agent, or Firm* — Jordan IP Law, LLC; Rachel A. Kahler

(57) ABSTRACT

The present disclosure is directed to rotary molded products and methods of making rotary molded products. Methods of making rotary molded products include combining a reduced-fat dough with a fat to make a dough with the ability to be used in a novel array of rotary molded shapes. Dough pieces and cooked rotary molded products having novel features and dimensions are also provided.

10 Claims, 6 Drawing Sheets

(56) References Cited

U.S. PATENT DOCUMENTS

| | | | |
|---|---|---|---|
| 5,514,404 A | 5/1996 | Zimmerman et al. | |
| 5,683,734 A | 11/1997 | Israel | |
| 5,855,945 A * | 1/1999 | Laughlin | A21D 10/00 |
| | | | 426/549 |
| 7,067,167 B2 | 6/2006 | Damsgard et al. | |
| 7,892,588 B1 | 2/2011 | Sudha et al. | |
| 8,309,149 B2 | 11/2012 | Yokoyama | |
| 9,028,240 B2 | 5/2015 | Vargas et al. | |
| 2008/0138472 A1 * | 6/2008 | Alexandre | A23L 33/21 |
| | | | 426/104 |
| 2008/0274251 A1 * | 11/2008 | Paulson | A21D 10/025 |
| | | | 426/549 |
| 2009/0004356 A1 | 1/2009 | Bunke et al. | |
| 2009/0291169 A1 * | 11/2009 | Mihalos | A21D 13/32 |
| | | | 426/94 |
| 2009/0311387 A1 * | 12/2009 | Plank | A21D 2/16 |
| | | | 426/94 |
| 2010/0196571 A1 * | 8/2010 | Tham | A21D 13/24 |
| | | | 426/502 |
| 2013/0122174 A1 | 5/2013 | Miller et al. | |
| 2015/0037469 A1 * | 2/2015 | Folz | A21C 5/003 |
| | | | 426/103 |
| 2015/0305350 A1 | 10/2015 | Mihalos et al. | |
| 2016/0029646 A1 * | 2/2016 | Okoniewska | A23L 7/117 |
| | | | 426/89 |
| 2017/0251681 A1 * | 9/2017 | Aymard | A21D 2/18 |
| 2018/0317502 A1 * | 11/2018 | Rade-Kukic | A21D 13/80 |

FOREIGN PATENT DOCUMENTS

| | | |
|---|---|---|
| IN | 738/DEL/2005 | 6/2009 |
| WO | WO 1994/0002023 | 2/1994 |
| WO | WO 2012/054489 | 4/2012 |
| WO | WO 2013/116728 | 8/2013 |

OTHER PUBLICATIONS

Mintel, "*Peanut Butter Chocolate Granola Cups*", http://www.gnpd.com.

Olewnik et al., "*The Effect of Mixing Time and Ingredient Variation on Farinograms of Cookie Doughs*", Cereal Chemistry, vol. 61, No. 6, pp. 532-537, 1984.

Manley, "*Biscuit Dough Piece Forming*", Biscuit, Cookie and Cracker Manufacturing Manuals, pp. 60-73, Jan. 1998.

Maache-Rezzoug et al., "*Effect of Principal Ingredients on Rheological Behaviour of Biscuit Dough and on Quality of Biscuits*", Journal of Food Engineering, No. 35, pp. 23-42, 1998.

Whiteley, "*Machine Room Equipment*", Biscuit Manufacture: Fundamentals of In-Line Production, pp. 219-229, 1971.

* cited by examiner

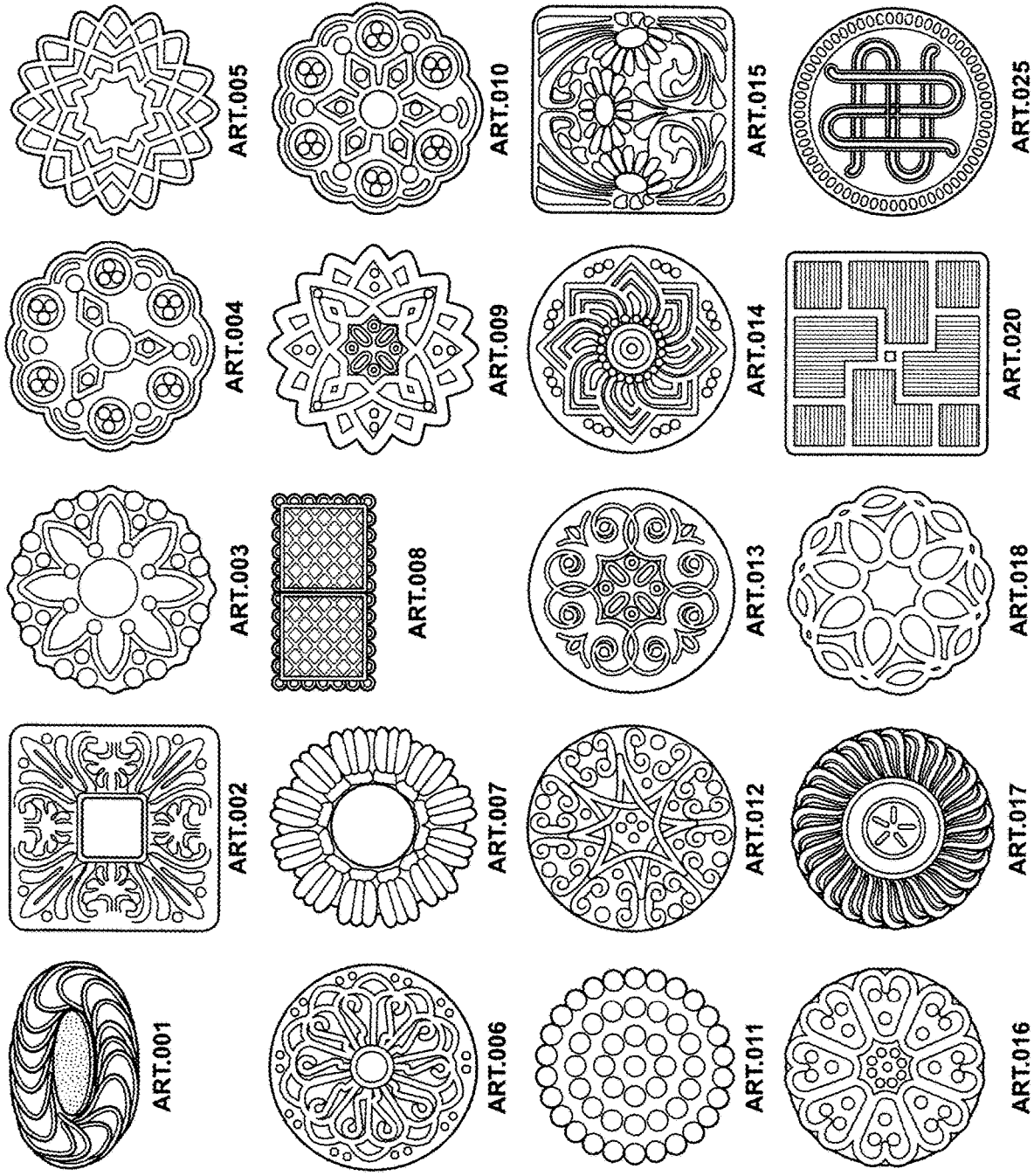

ROTARY MOLDED FOOD PRODUCT AND METHODS OF MAKING

CROSS-REFERENCE TO RELATED APPLICATIONS

This application represents a National stage application of PCT/US2017/042343, filed Jul. 17, 2017, entitled "Rotary Molded Food Product and Methods of Making", pending. The entire content of this application is incorporated by reference.

BACKGROUND

Cookies, hard biscuits, and crackers are popular treats made from dough that is to be formed in large quantities using a rotary molding machine. Such rotary molded treats are readily distinguishable from similar products made using other shaping methods, such as wire cutting, by the uniformity of the product and relatively smooth surfaces and edges.

Manufacturers often distinguish their cookies, hard biscuits, and crackers by including embossing or decorations on the surface and edges of such treats. Embossing or decorations are often transferred to the dough as it's formed in the molds of a rotary molding machine.

SUMMARY

A method of making rotary molded dough pieces from a dough is provided herein. The method includes providing a reduced-fat dough, combining a fat with the reduced-fat dough to produce a dough, the fat included in the dough in an amount of from about 8% to about 30% by weight of the dough, and forming the dough into pieces using a rotary molding machine. A reduced-fat dough includes water, sugar, flour, and up to 75% of the fat content of the dough (e.g., 0% or up to 50% of the fat content of the dough). In some embodiments, a sugar includes a syrup, honey, crystalline sugar, or combinations thereof.

In some embodiments, a method of making rotary molded dough pieces provides a reduced-fat dough that includes particulates.

In some embodiments, a method of making rotary molded dough pieces further includes making the reduced-fat dough by first combining the sugar with the water, then adding the flour to the sugar and water.

In some embodiments, a method of making rotary molded dough pieces forms dough pieces that have a height spanning a first surface and a second surface, where the height is about 0.25 to 0.75 inches, where the first surface has an indentation that has a depth at least 30% of the height of the dough pieces, and where the indentation has a width that is at least 100% of the depth of the indentation. In some embodiments, the dough pieces each have a width that is no more than 300% the width of the indentation. In some embodiments, the indentation of a rotary molded dough piece has a bottom that is substantially parallel to the second surface, and at least one wall adjoining the bottom to form an angle, where the angle is between 90° and 120°.

In some embodiments, a method of making rotary molded dough pieces provided herein forms dough pieces that are cup-shaped or boat-shaped.

In some embodiments, a method making rotary molded dough pieces forms dough pieces that have two or more indentations.

A method of making a rotary molded cookie, biscuit, or cracker is provided herein. The method includes providing a reduced-fat dough, combining a fat with the reduced-fat dough to produce a dough, the fat included in the dough in an amount of from about 8% to about 30% by weight of the dough, forming the dough using a rotary molding machine and cooking the dough to form the rotary molded cookie, biscuit, or cracker.

A rotary molded dough piece is provided herein. A rotary molded dough piece can have a height spanning a first surface and a second surface, where the height is 0.25 inches to 0.75 inches, where the first surface has an indentation that has a depth at least 30% of the height of the dough piece, and where the indentation has a width that is at least 100% of the depth of the indentation. In some embodiments, a rotary molded dough piece has a width that is no more than 300% the width of the indentation. In some embodiments, a rotary molded dough piece has an indentation that has a bottom that is substantially parallel to the second surface, and at least one wall adjoining the bottom to form an angle, where the angle is between 90° and 120°.

In some embodiments, a rotary molded dough piece provided herein is cup shaped.

In some embodiments, a rotary molded dough piece provided herein includes two or more indentations.

A rotary molded cookie, biscuit, or cracker is provided herein. A rotary molded cookie, biscuit, or cracker has a height spanning a first surface and a second surface, where the height is about 0.25 to 0.75 inches, where the first surface has an indentation that has a depth at least 30% of the height of the rotary molded cookie, biscuit, or cracker, and where the indentation has a width that is at least 100% of the depth of the indentation. In some embodiments, a rotary molded cookie, biscuit, or cracker has a width that is no more than 300% the width of the indentation. In some embodiments, a rotary molded cookie, biscuit, or cracker has an indentation that has a bottom that is substantially parallel to the second surface, and at least one wall adjoining the bottom to form an angle, the angle being between 90° and 120°.

In some embodiments, a rotary molded cookie, biscuit, or cracker provided herein is cup shaped or boat-shaped.

In some embodiments, a rotary molded cookie, biscuit, or cracker provided herein includes a filling in an indentation.

These and various other features and advantages will be apparent from a reading of the following detailed description.

DRAWINGS

DETAILED DESCRIPTION

Rotary molding is a common method forming cookie, cracker, and hard biscuit dough. Rotary molding can provide a consistent product, and can further provide a means to apply designs to one or more surface or edge of a cookie, cracker, or hard biscuit.

Rotary molding machines are available in various configurations and from various manufacturers, but generally function by pressing a dough between a turning roller having one or more mold on its surface and another surface to form the dough in the mold(s), then using friction to pull the formed dough from the mold(s) as the roller turns away from the other surface. The friction to pull the formed dough from the mold(s) is typically generated by contacting an exposed surface on the bottom of the formed dough in the mold(s) to a conveyor belt. The conveyor belt then conveys the molded dough away from the roller.

Because rotary molding machines rely on friction to remove dough from a mold, molds used in rotary molding machines are generally shallow (i.e., less than 0.25 inches) to ensure that the friction of the conveyor belt is sufficient to overcome surface interactions of the dough with the mold. In addition, decorations on the surface of rotary molded dough products, such as cookies, crackers, and hard biscuits, tend to be shallow relative to the overall thickness of the rotary molded dough in order to reduce surface interactions of the dough, as well as any vacuum created by the removal of the dough from the mold.

Although coatings and lubricants can be applied to the insides of molds on rotary molding machines, rotary molds remain shallow with shallow decorations since coatings can reduce the sharpness of decorations and lubricants, such as oils, can both foul the rotary molding machinery and affect the fat content of the final product.

Figure 1:
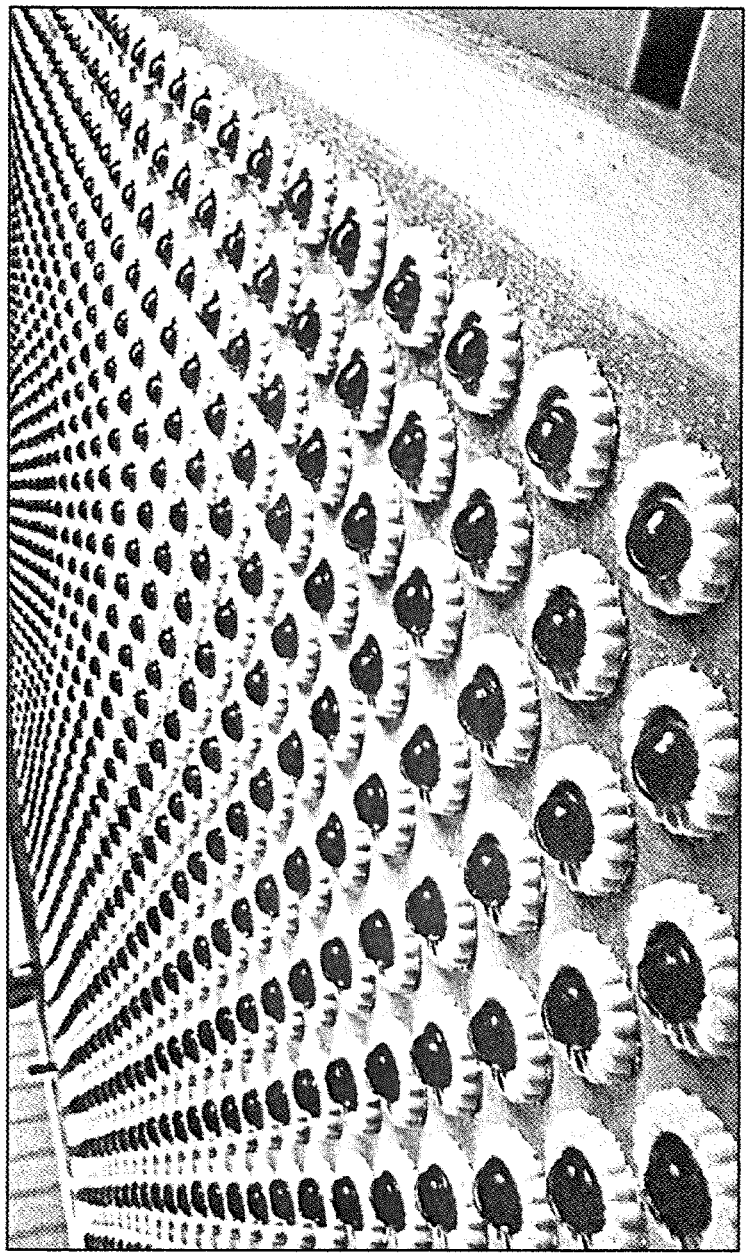
FIG. 1 shows prior art rotary molded products, showing flat products with relatively shallow decorations.

As a result, rotary molded dough products tend to be fairly flat (i.e., less than 0.25 inches thick), often with shallow decorations, and generally have a large surface area on the bottom, where the conveyor belt contacts the dough to ensure sufficient friction to remove the dough from the mold. FIG. 1 shows a selection of various typical rotary molded dough products.

As disclosed herein, it has been discovered that by re-ordering the order of ingredient addition to make a dough, the dough becomes easier to remove from a rotary mold. In particular, a dough made by first producing a reduced-fat dough, including water, sugar, and flour, followed by adding a fat to the reduced-fat dough, releases more readily from a mold. As a result, it was further discovered that such a dough could be formed in molds that are deeper, provide larger and/or deeper indentations in the formed dough, and/or have steeper angles around the edges of indentations in the formed dough.

Thus, provided herein are methods of making rotary molded dough pieces, where the dough is made by combining a reduced-fat dough with a fat. As used herein, the term "reduced-fat dough" refers to a composition including water, sugar, and flour. In some embodiments, a reduced-fat dough can also include a portion of fat that contributes up to 75% (e.g., up to 25% or up to 50%) of the fat in the dough used to make rotary molded dough pieces. In some embodiments, a reduced-fat dough can further include particulates, such as whole grains, grain pieces, rolled grains, nuts or nut pieces, dried fruit pieces, and the like. In some embodiments, a reduced-fat dough is non-fat. A non-fat dough may contain fats inherent to any of the ingredients, such as fats found in particulates, such as nuts, but does not contain any added fat.

Ingredients in a reduced-fat dough can be added in any order to produce the reduced-fat dough. However, in some embodiments, ingredients can be combined in an order that provides the desired level of hydration or dissolution of dry ingredients, such as flour and sugar. For example, sugar and water can be combined before adding flour to improve dissolution of the sugar prior to hydration of the flour. Sugar in a reduced-fat dough can be partially or fully dissolved.

A fat is combined with the reduced-fat dough provided herein to produce a dough having a flour content of from about 5% to about 55% (e.g., from about 5% to about 35%) by weight of the dough, a water content of from about 0.5% to about 5% (e.g., from about 0.6% to about 3%, or about 1% to about 2%) by weight of the dough, a sugar content of from about 10% to about 30% (e.g., from about 15% to about 20%) by weight of the dough, and a fat content of from about 8% to about 30% (e.g., from about 10% to about 25%, or from about 10% to about 14%) by weight of the dough.

A dough provided herein can contain any appropriate flour, with grain flours (e.g., wheat flour, oat flour, barley flour, rice flour, and the like) being preferred. The amount and type of flour can be adjusted based on the desired nutritional content, desired texture of the final product, desired flavor of the final product, or any other appropriate attribute. In some embodiments, a combination of flours can be used to provide the desired product attributes. In some embodiments, additional flour, other than that included in a reduced-fat dough, can be added following the combination of the reduced-fat dough and fat in order to provide a desired dough attribute (e.g., reduce stickiness of the dough) and/or to provide a desired attribute to the final product (e.g., desired texture or nutritional content).

A dough provided herein can include any appropriate sugar type or form. For example, a dough provided herein can include a crystalline sugar (e.g., granulated or powdered sucrose), honey, a syrup (e.g., maple or corn syrup), or any combination thereof. In some embodiments, the amount, form, and/or type of sugar can be adjusted in order to provide a desired dough or final product attribute. For example, the amount and/or type of sugar can be adjusted to provide a desired level of Maillard browning on the final product. In another example, a dough can include honey or maple syrup in order to provide a desired honey flavor or maple flavor, or to reduce the amount of refined sugar in the final product.

Fat in a dough provided herein can be any edible fat, including those that are solid, semi-solid, or liquid at room temperature. Examples of appropriate fats include vegetable based fats (e.g., vegetable-based shortenings, vegetable-based oils, vegetable oil fractions, and the like), animal-based fats (e.g., butter, lard, and the like), microbe-based fats (e.g., algae oils), and combinations thereof. Fats that are solid or semi-solid at room temperature (e.g., coconut oil, butter, palm oil, shortenings, and the like) can be used to provide a shorter texture in the final product. Fats that are liquid at room temperature (e.g., canola oil, sunflower oil, soybean oil, and the like) can be used to provide a crisper and/or harder texture to the final product.

In some embodiments, the amount and/or type of fat can be adjusted based on the amount and/or type of other ingredients in the dough. For example, the amount of a fat can be increased in the presence of a gluten-containing dough in order to provide a desired dough texture or final product texture.

A fat in a dough provided herein can be incorporated into the dough fully, such that the fat is evenly distributed throughout the dough, or it can be heterogeneously incorporated, such that there are areas of higher concentrations of fat and areas of lower concentrations or no fat within the dough. A fat that is heterogeneously incorporated into the dough can be more readily forced to the surface of the dough when the dough is formed in a rotary molding machine, such that it can provide better lubrication of the dough within the molds of the rotary molding machine and be more easily and cleanly pulled out by the conveyor belt. In some embodiments, the degree of incorporation can be adjusted based on the amount and type of fat being used. For example, a solid fat can be heterogeneously incorporated. The level of incorporation of a fat can adjusted by increasing the mixing speed or duration of the fat into a reduced-fat dough, providing increased or more homogenous incorporation, or decreasing the mixing speed or duration of the fat into a reduced-fat dough, providing decreased or more heterogeneous incorporation.

In some embodiments, a dough provided herein can include one or more particulate. In some embodiments, as described above, a particulate can be included in a reduced-fat dough prior to the addition of a fat. In some embodiments, a particulate can be added in a dough after the incorporation of a fat into the dough. In some embodiments, a particulate can be added both before and after the incorporation of a fat into a dough provided herein. In some embodiments, the amount and timing of the addition of particulates into a dough can be determined based on the type of particulates to be added in order to maintain the integrity of the particulates. For example, low or non-hydrating particulates (e.g., nuts, whole grains, or waxy confections, such as chocolate chips) can be preferred to be added to a reduced-fat dough, while hydrating particulates (e.g., rolled grains, dried fruit pieces, and non-waxy confections, such as candy pieces) can be added following incorporation of fat into the dough.

In some embodiments, the amount of water in a dough provided herein can be adjusted based on the type and/or content of other ingredients in the dough. For example, water content can be adjusted in the presence of a gluten-containing flour (e.g., a wheat flour) in order to increase or decrease the development of gluten in the dough. In another example, water content can be increased in the presence of particulates, such as whole grains, grain pieces, and rolled grains, in order to ensure sufficient water to provide a desired dough texture or texture of the final product.

A reduced-fat dough and a dough including a reduced-fat dough provided herein can be made using any appropriate method and equipment. Examples of appropriate equipment includes, but is not limited to, horizontal bar mixers, paddle mixers, spiral mixers, planetary mixers, and sigma arm mixers. For example, a reduced-fat dough can be made in a batch mixer, followed by the addition of a fat in the same mixer to make a dough. In another example, a reduced-fat dough can be made in one piece of equipment and transferred to another piece of equipment for the addition of a fat to make a dough.

Figure 2:
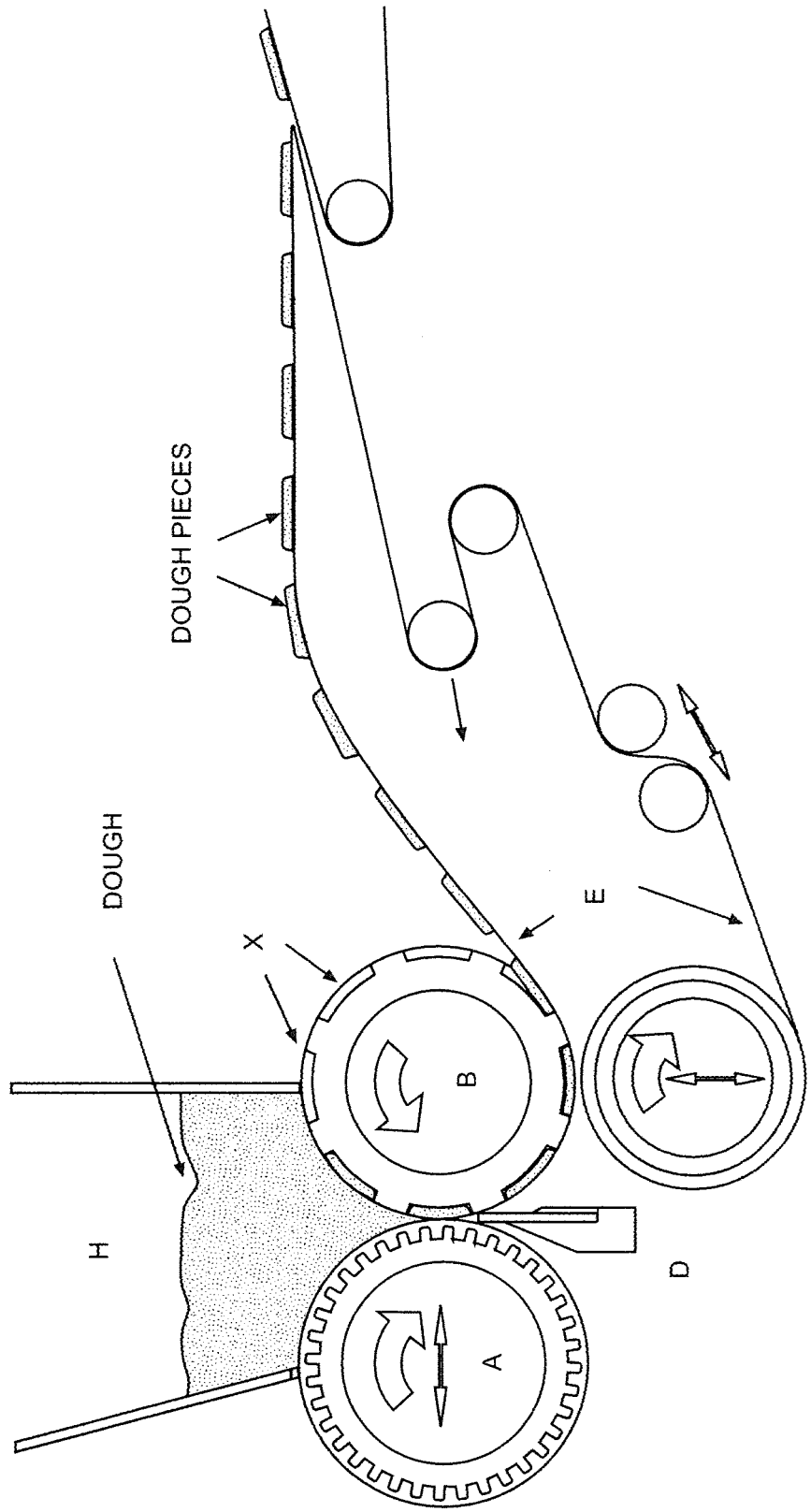
FIG. 2 shows a cross section of a generic rotary molding machine.

A dough provided herein can be fed into a rotary molding machine to make rotary molded dough pieces. A wide variety of rotary molding machines are available and are suitable for use in a method of making rotary molded dough pieces. Examples of rotary molding machines are made by Baker Perkins (Grand Rapids, MI, USA) and Oka (Darmstadt, Germany). FIG. 2 shows a cross section of a known generic rotary molding machine. Hopper H holds a dough that is then fed between a roller A and roller B, where roller A presses dough into molds X on roller B. A knife or scraper D removes excess dough from the molds. Shaped dough is pulled from the molds by belt E.

A rotary molding machine suitable for use in a method of making rotary molded dough pieces is fitted with one or more molds configured to form a dough provided herein into dough pieces. Molds suitable for use can be made from any appropriate materials, including metal, rubber, plastic, and the like. A mold suitable for use may also be uncoated or coated with a coating, such as PTFE, or otherwise treated to reduce sticking of a dough to the mold.

A mold suitable for use in a method of making rotary molded dough pieces is generally of similar size and shape as the desired size and shape of the dough pieces. A dough provided herein provides particular advantage in the ability to rotary mold dough into pieces that have dimensions and/or features (e.g., indentations or wall angles) that are not found in rotary molded doughs available in the art. Without being bound to theory, it is believed that by incorporating ingredients into a dough as described above, the dough retains an ability to be readily molded as doughs known in the art, but also gains the ability to be released from a mold with reduced effect from surface interactions with a mold, reduced effect from vacuums created when removing the dough from the mold (e.g., from large indentations in the molded dough or relatively deep molds), and/or requiring reduced friction to remove it from the mold.

Figure 3:
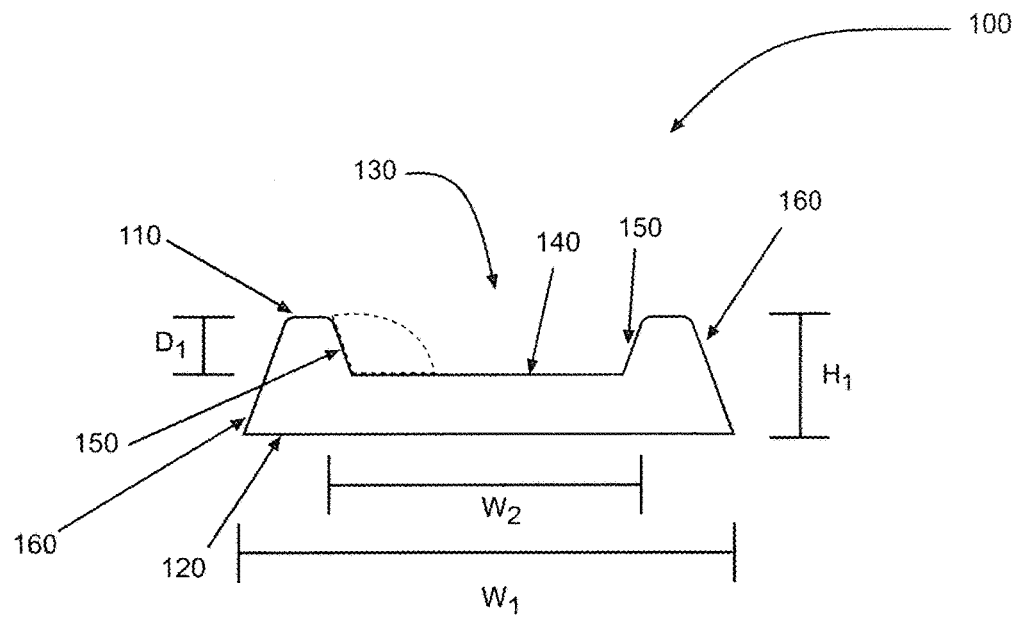
FIG. 3 shows a cross section of an embodiment of a dough piece provided herein.
Figure 4:
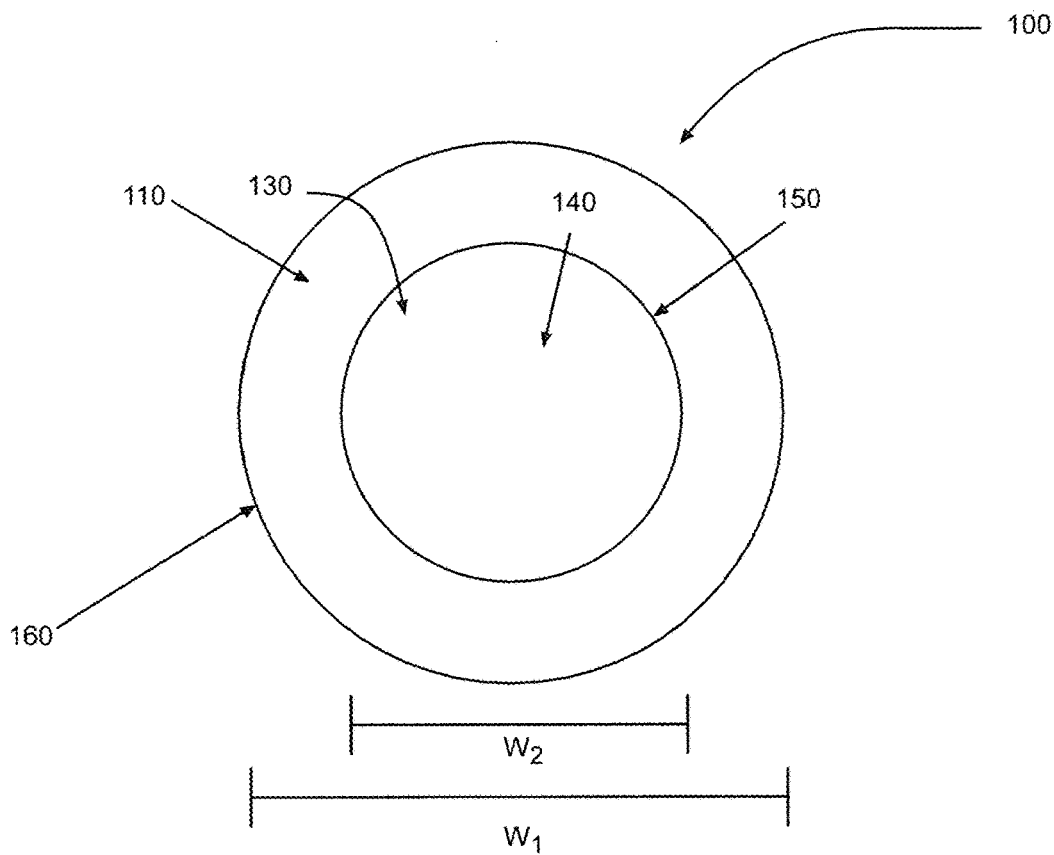
FIG. 4 shows a top view of the embodiment shown in FIG. 3.

FIG. 3 shows a cross section of an example of a dough piece provided herein. FIG. 4 shows a top view of the example in FIG. 3, using the same feature designations. Dough piece 100 illustrated in FIG. 3 has a first surface 110 and a second surface 120, with a height $H_1$ and an outer wall 160 spanning the first surface 110 and second surface 120, and a width $W_1$, at its widest. In some embodiments, a rotary molded dough piece provided herein can have a height $H_1$ (also termed "thickness" herein) that is greater than known products made from rotary molded dough. For example, while known products made from rotary molded dough are typically less than 0.25 inches in thickness, a rotary molded dough piece provided herein can have a thickness $H_1$ of at least 0.25 inches (e.g., from 0.25 inches to about 0.75 inches, or from about 0.3 inches to about 0.55 inches).

In some embodiments, first surface 110 is rounded, as illustrated. However, a first surface need not be rounded, but can be flat or otherwise contoured.

In some embodiments, a rotary molded dough piece can include a relatively deep and/or large indentation on at least one surface of the dough piece. In the example in FIG. 3, dough piece 100 includes an indentation 130 in surface 110. Indentation 130 has a width $W_2$, at its widest, a depth $D_1$, at its deepest, a bottom 140 that is substantially parallel to surface 120, and at least one inner wall 150 adjoining the bottom 140 at angle $A_1$ to connect bottom 140 to surface 110. In some embodiments dough piece 100 can include one or more indentation 130 that has a depth $D_1$ of at least 30% (e.g., at least 40%, or at least 50%) of the thickness $H_1$ of dough piece 100. In some embodiments, an indentation can traverse the entire thickness of a dough piece provided herein (i.e., the indentation is 100% the thickness of the dough piece).

In some embodiments, indentation 130 on surface 110 of dough piece 100 can have a width $W_2$ that is at least 100% (e.g., at least 150%, or at least 200%) of the depth $D_1$ of indentation 130. In some embodiments, a width $W_2$ of indentation 130 can be at least 30% (e.g., at least 40%, or at least 50%) the width $W_1$ of dough piece 100. Alternatively, in some embodiments, a width $W_1$ of dough piece 100 can be no more than 300% (e.g., no more than 250%, or no more than 200%) the width $W_2$ of indentation 130.

Surprisingly, a rotary molded dough piece provided herein can include a wall (150 in FIG. 3) in an indentation, or an outer wall (160 in FIG. 3) that is relatively steep (e.g., between 90° and 130° relative to a surface). For example, in some embodiments, wall 150 of indentation 130 can form an angle $A_1$ with bottom 140 that is between 90° and 120° (e.g., from about 95° to about 110°).

It is to be understood that the dimensions of a dough piece provided herein should be measured at their greatest point for the purposes of calculating relative measurements. For example, if a dough piece provided herein has a maximum height of 0.5 inches, the depth of an indentation, at its deepest can be at least 0.15 inches deep (30% of 0.5 inches) at its deepest, and can be at least 0.15 inches wide (100% of 0.15 inches) at its widest. It is further to be understood, that a relative dimension described above (e.g., indentation depth as a percent of dough piece thickness, or indentation width as a percent of indentation depth) need not fit the described criteria in every direction. See, for example, FIGS. 5 and 6.

Figure 5:
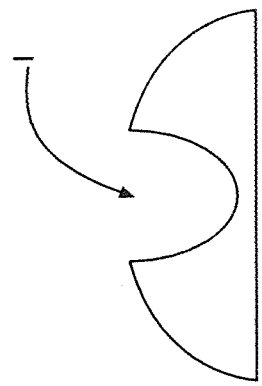
FIG. 5 shows cross sections of embodiments of dough pieces provided herein.
Figure 5:
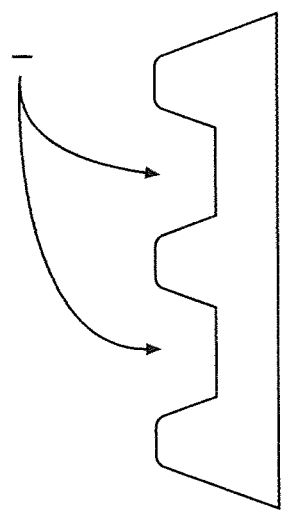
Figure 5:
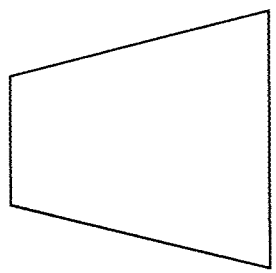
Figure 6:
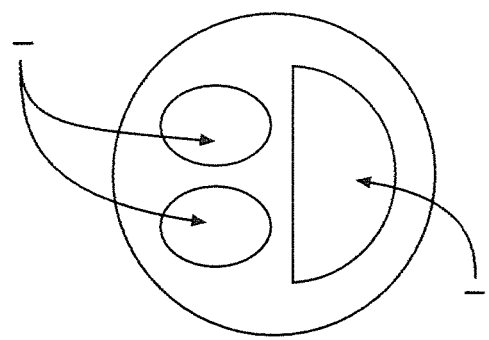
FIG. 6 shows top views of embodiments of dough pieces provided herein.
Figure 6:
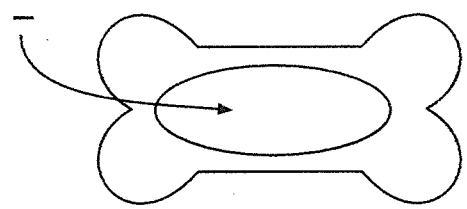
Figure 6:
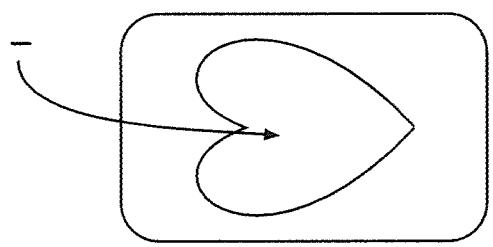
Figure 6:
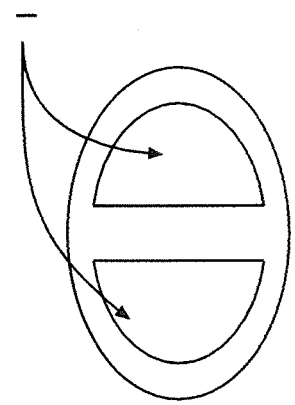

A dough piece provided herein can have any shape desired, and as many indentations as desired, including 0 indentations. FIGS. 3 and 4 provide an example of a dough piece having a round shape and single, round indentation, which gives it a cup shape. FIG. 5 provides side views of additional examples, with any indentations designated with an "I". FIG. 6 provides top views of additional examples, with any indentations designated with an "I".

A dough piece provided herein can be cooked using any appropriate method, such as baking or frying, to make a cookie, a biscuit, or a cracker having similar dimensions to the dough piece. It is to be understood that a cookie, a biscuit, or a cracker made from a dough piece provided herein can have slightly different dimensions than the dough piece from which it is made due to cooking. For example, some of the dimensions of a cookie, a biscuit, or a cracker provided herein may be slightly smaller than the dough piece from which it is made due to shrinkage due to dehydration during cooking. In another example, leavening of a dough piece provided herein during cooking can result in some dimensions that are slightly larger in the resulting cookie, a biscuit, or a cracker.

In some embodiments, a dough piece provided herein can be stored, packaged, and/or sold before cooking. For example, a dough piece provided herein can be packaged as a refrigerated or frozen dough piece to be cooked later by a consumer in, for example, a food service kitchen or a home kitchen.

In some embodiments, a dough piece provided herein can have at least one indentation at least partially filled with a filling or another dough prior to cooking. For example, a second dough can be added to an indentation to provide visual appeal or a different flavor to the final product.

In some embodiments, a dough piece provided herein can be at least partially cooked (e.g., par baked or fully cooked) immediately after forming to form a cookie, a biscuit, or a cracker. For example, a dough piece can be conveyed from a rotary molding machine to an in-line oven or fryer to bake the dough piece to form a cookie, a biscuit, or a cracker.

In some embodiments, a cookie, a biscuit, or a cracker provided herein can have at least one indentation at least partially filled with a filling. A filling added to an indentation of a cookie, a biscuit, or a cracker provided herein can be suitable for eating without any further cooking (e.g., a nut butter filling, a frosting, chocolate, or a jelly filling), or can require additional cooking. For example, a par baked cookie, a biscuit, or a cracker provided herein can be filled with a filling that requires further cooking, then the filled par baked dough piece can be further cooked to produce a final product.

In some embodiments, a cookie, a biscuit, or a cracker provided herein can be packaged for sale to a consumer. A packaged cookie, a biscuit, or a cracker provided herein can be either unfilled, to be consumed directly or filled before being consumed, or can be filled.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of making rotary molded dough pieces from a dough having a fat content of about 8% to about 30% by weight of the dough and a water content of about 0.5% to about 5% by weight of the dough, the method comprising:
   a. providing an initial dough, the initial dough including water, sugar, flour, and a portion of fat that contributes up to 75% of the fat content of the dough from which the rotary molded dough pieces are made;
   b. mixing the initial dough with an additional fat to produce the dough having a fat content of about 8% to about 30% by weight of the dough and a water content of about 0.5% to about 5% by weight of the dough; and
   c. forming the dough having a fat content of about 8% to about 30% by weight of the dough and a water content of about 0.5% to about 5% by weight of the dough into pieces using a rotary molding machine,
   wherein the dough pieces each have a height spanning a first surface and a second surface, the height being about 0.25 to 0.75 inches, the first surface having an indentation that has a depth at least 30% of the height of the dough pieces, and the indentation having a width that is greater than or equal to the depth of the indentation.

2. The method of claim 1, wherein the portion of fat contributes up to 50% of the fat content of the dough from which the rotary molded dough pieces are made.

3. The method of claim 1, wherein the sugar comprises a syrup, honey, crystalline sugar, or combinations thereof.

4. The method of claim 1, wherein the method further comprises making the initial dough by first combining the sugar with the water, then adding the flour to the sugar and water.

5. The method of claim 1, wherein the initial dough further comprises particulates.

6. The method of claim 1, wherein the dough pieces each have a width that is no more than 300% the width of the indentation.

7. The method of claim 1, wherein the dough pieces are cup-shaped or boat-shaped.

8. The method of claim 1, wherein the indentation has a bottom that is substantially parallel to the second surface, and at least one wall adjoining the bottom to form an angle, the angle being between 90° and 120°.

9. The method of claim 1, wherein the dough pieces each have at least one additional indentation.

10. The method of claim 1, further comprising cooking the dough pieces.

* * * * *